UNITED STATES PATENT OFFICE.

ROBERT E. SCHMIDT, OF ELBERFELD, GERMANY, ASSIGNOR TO THE FARBENFABRIKEN OF ELBERFELD COMPANY, OF NEW YORK, N. Y.

DARK-GREEN ALIZARIN DERIVATIVE.

SPECIFICATION forming part of Letters Patent No. 603,659, dated May 10, 1898.

Application filed December 14, 1897. Serial No. 661,871. (No specimens.) Patented in Germany October 14, 1894, No. 84,509; in France December 3, 1894, No. 243,316; in England December 8, 1894, No. 23,927, and in Italy December 31, 1894, XXIX, 37,890, LXXIV, 206.

*To all whom it may concern:*

Be it known that I, ROBERT E. SCHMIDT, doctor of philosophy, chemist, residing at Elberfeld, Germany, (assignor to the FARBENFABRIKEN OF ELBERFELD COMPANY, of New York,) have invented a new and useful Improvement in Green Alizarin Dye, (for which the Farbenfabriken, vormals Friedrich Bayer & Co., of Elberfeld, Germany, has already obtained Letters Patent in Germany, No. 84,509, dated October 14, 1894; in England, No. 23,927, dated December 8, 1894; in France, No. 243,316, dated December 3, 1894, and in Italy, Reg. Gen., Vol. XXIX, No. 37,890, Reg. Att., Vol. LXXIV, No. 206, dated December 31, 1894;) and I hereby declare the following to be a clear and exact description of my invention.

My invention relates to the production of a new class of alizarin dyestuffs by acting with sulfonating agents on alizarin compounds having most probably the general formula

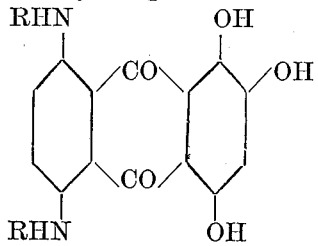

R representing in this formula an aromatic radical, such as phenyl, tolyl, xylyl, naphthyl, or the like. The said alizarin compounds are obtained from one molecule of the so-called "alizarin pentacyanin," having the formula

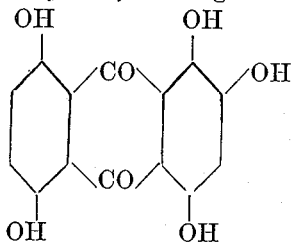

and two molecules of a primary aromatic amin—for instance, in the manner described in German Letters Patent No. 86,150, dated October 14, 1894, or No. 91,150, dated March 11, 1896, (both granted to the Farbenfabriken, vormals Friedrich Bayer & Co., of Elberfeld, Germany.)

The new dyestuffs are sulfonic acids of the above-mentioned condensation products from one molecule of alizarin pentacyanin and two molecules of a primary aromatic amin. When dry and pulverized, they represent dark powders soluble in water with a green color. If the dyestuffs are treated with zinc-dust in the presence of dilute acetic acid, certain products of reduction are obtained, which when heated with dilute sulfuric acid are split, so-called "leuco alizarin pentacyanin" being produced, which body has been described in the German Letters Patent No. 89,027, dated October 12, 1895.

The coloring-matters dye unmordanted and chrome-mordanted wool green shades. When printed or dyed on chrome-mordanted cotton cloth, the new dyestuffs produce beautiful green shades which are fast to light.

In carrying out my process practically I can proceed as follows: A solution prepared from ten kilos, by weight, of the condensation product of one molecule of alizarin pentacyanin and two molecules of paratoluidin having most probably the formula

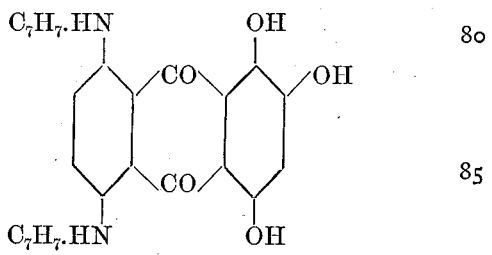

and one hundred kilos of sulfuric monohydrate (containing one hundred per cent. of $H_2SO_4$) is heated at from 70° to 80° centigrade until a test portion is found to be clearly soluble in hot water. At this stage the reaction mixture is poured into two thousand liters of ice-water. The coloring-matter is precipitated from the resulting mixture by means of common salt. It is filtered off and can be used for dyeing or printing purposes either in a pasty state or after previous drying.

When dry and pulverized, it represents a dark-green powder soluble in water with a green color. If zinc-dust is gradually added to the watery solution of the dyestuff acidulated by means of acetic acid, a leuco derivative of the dyestuff is formed which can be recognized from the fact that the color of the solution changes from green into yellow. On adding a small quantity of sulfuric acid to the filtered yellow solution and subsequently heating the dyestuff molecule is split, the above-mentioned leuco alizarin pentacyanin being formed.

The new coloring-matter dyes unmordanted and chrome-mordanted wool green shades which are fast to light. When printed or dyed on chrome-mordanted cotton cloth, the dyestuff produces green shades which are distinguished by their brightness and fastness against the action of light.

Having now described my invention and in what manner the same is to be performed, what I claim as new, and desire to secure by Letters Patent, is—

1. The process for producing new dyestuffs being sulfo-acids of the condensation products obtainable from one molecule of alizarin pentacyanin and two molecules of a primary aromatic amin and having most probably the general formula

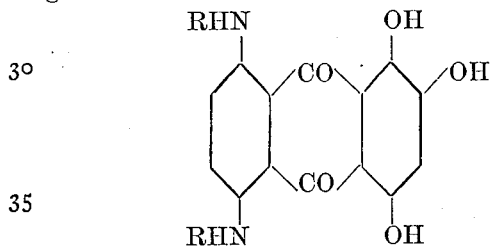

in which formula R represents an aromatic radical, such as phenyl, tolyl, xylyl, naphthyl, which process consists in sulfonating the said condensation products substantially as hereinbefore described.

2. The process for producing a new dyestuff being a sulfo-acid of the condensation product obtainable from one molecule of alizarin pentacyanin and two molecules of paratoluidin and having most probably the formula:

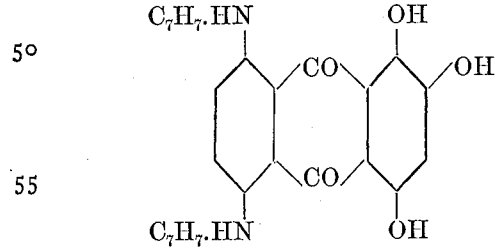

which process consists in treating the said condensation product with sulfonating agents such as sulfuric monohydrate substantially as hereinbefore described.

3. As new articles of manufacture the new alizarin dyestuffs obtainable by sulfonation of the condensation products from one molecule of alizarin pentacyanin and two molecules of a primary aromatic amin, representing when dry and pulverized dark powders dissolving in water with a green color yielding leuco alizarin pentacyanin if they are reduced by means of zinc-dust and diluted acetic acid and if the reduction products are heated with dilute sulfuric acid, dyeing unmordanted and chrome-mordanted wool green shades, yielding on chrome-mordanted cotton beautiful green shades fast to light, substantially as described.

4. As a new article of manufacture the specific dyestuff obtainable by sulfonation of the product of condensation from one molecule of alizarin pentacyanin and two molecules of paratoluidin, being a sulfo-acid of the alizarin derivative having most probably the formula:

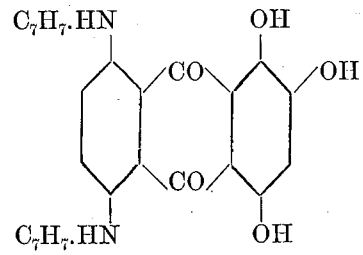

representing when dry and pulverized a dark-green powder dissolving in water with a green color, which changes into yellow on acidulating and adding zinc-dust, the filtered solution separating leuco alizarin pentacyanin after heating with a small quantity of sulfuric acid, dyeing unmordanted and chrome-mordanted wool green shades fast to light, yielding on chrome-mordanted cotton green shades which are distinguished by their brightness and fastness against the action of light, substantially as described.

In testimony whereof I have signed my name in the presence of two subscribing witnesses.

ROBERT E. SCHMIDT.

Witnesses:
R. E. JAHN,
OTTO KÖNIG.